United States Patent [19]
Monti

[11] 3,821,414
[45] June 28, 1974

[54] DIRECT COMPRESSION VEHICLE

[75] Inventor: Anthony Monti, Irvington, N.Y.

[73] Assignee: SuCrest Corporation, New York, N.Y.

[22] Filed: Sept. 30, 1971

[21] Appl. No.: 185,344

Related U.S. Application Data

[63] Continuation of Ser. No. 885,980, Dec. 17, 1969, abandoned.

[52] U.S. Cl.................. 424/361, 106/209, 424/363
[51] Int. Cl.... A61k 9/00, C08b 25/00, C08b 27/04
[58] Field of Search..................... 106/209; 424/361

[56] References Cited
UNITED STATES PATENTS

| | | | |
|---|---|---|---|
| 3,042,668 | 7/1962 | Monti et al. | 260/209 |
| 3,134,719 | 5/1964 | Sheth et al. | 424/229 |
| 3,181,998 | 5/1965 | Kanig | 424/94 |
| 3,639,168 | 2/1972 | Monti et al. | 424/361 |

*Primary Examiner*—Allan Lieberman
*Attorney, Agent, or Firm*—Kenyon & Kenyon et al.

[57] ABSTRACT

A mixture of a major amount of tricalcium phosphate and a minor amount of locust bean gum is useful for the preparation of tablets by the direct compression technique. The mixture is admixed with an active material, and, if desired, fillers, disintegrating agents and lubricants, and the resulting mixture is compressed without prior granulation or slugging to form a tablet.

3 Claims, No Drawings

DIRECT COMPRESSION VEHICLE

This is a continuation of application Ser. No. 885,980 filed Dec. 17, 1969, now abandoned.

This invention relates to direct compression vehicles. More particularly, this invention relates to a particulate composition which can be admixed with an active material and, optionally, fillers, disintegrating agents and lubricants, and the resulting mixture directly compressed into a tablet without the necessity of granulation or slugging of the mixture.

There are two general methods for forming tablets, i.e., compression of a dry particulate material and trituration, or molding of a moist material, of which the first technique is by far the most frequently employed. The compression technique may be further subdivided into three major categories, viz. direct compression, wet granulation and dry granulation. The direct compression technique is the most desirable, in that it employs the fewest steps and, in the case of the production of tablets containing sensitive or unstable actives, such as certain pharmaceuticals, minimizes the exposure to water or other conditions tending to adversely affect stability of the active. Unfortunately, however, it has been found that the direct compression technique is of limited applicability.

First, most active materials possess poor compression properties, and thus are unsuited to this technique. In addition, many actives are required in such small amounts per unit dosage form that direct compression of the active alone is impractical, if not impossible. As a result, the active must be admixed with a direct compression vehicle, i.e., an inert composition which is compatible with the active and has good compressibility. In addition, the direct compression vehicle should have good flowability, good stability under normal ambient conditions, no adverse effect on tablet disintegration time, the ability to produce good tablet surfaces, and low cost.

To date, however, no material has been found which satisfies all of these criteria. For example, of the most popular of such compression vehicles, spray-dried lactose possesses poor stability and discolors on storing, dicalcium phosphate provides tablets having poor strength, and microcrystalline cellulose is expensive.

It is an object of the present invention to provide a new direct compression vehicle.

It is a further object of this invention to provide a direct compression vehicle which may be combined with an active, and, if desired, fillers, disintegrating agents and lubricants, and the resulting dry mixture subjected to direct compression.

The direct compression vehicles of the present invention are an intimate, co-dried admixture of a minor portion of locust bean gum and a major portion of tricalcium phosphate. Neither locust bean gum nor tricalcium phosphate is useful as a direct compression vehicle because neither can be compressed into a tablet of adequate strength. It is surprising then, that a codried mixture of these materials is so useful.

By the term "major portion" is meant a portion greater than about 50 weight percent, and by the term "minor portion" is meant a portion less than about 50 weight percent. The minimum effective amount of locust bean gum is not narrowly critical, provided that the resulting tablet has the desired strength characteristics, which also depend upon the active component and other materials, e.g., fillers, disintegrating agents and lubricants, which may be incorporated with the mixture which is compressed into the tablet. In general, however, the direct compression vehicle of this invention should contain at least about 0.5 weight percent, and preferably at least about 1 weight percent, locust bean gum. Tablet strength increases with increasing proportions of locust bean gum, but ordinarily amounts in excess of about 20 or 30 weight percent are unnecessary. Higher proportions can be employed, but there is no corresponding improvement in tablet strength and, because locust bean gum is considerably more expensive than tricalcium phosphate, are not desirable from an economic standpoint. Amounts of locust bean gum in the range of from about 1 to about 10 weight percent are preferred, with an amount of about 5 weight percent being particularly preferred.

The mixture is obtained by forming an aqueous suspension or dispersion of locust bean gum and tricalcium phosphate in the desired proportions, drying the aqueous mixture and reducing the dried product to a particulate composition of the desired size.

To obtain the desired beneficial effects, it has been found that a more intimate mixture than that obtained by dry blending is necessary. Accordingly, the locust bean gum and tricalcium phosphate are mixed in an aqueous medium. The amount of water is not narrowly critical, provided that the resulting aqueous dispersion is sufficiently fluid to permit mixing. In general, this requires that there be at least 25 parts water per part locust bean gum, with amounts of at least 50 parts water per part locust bean gum being preferred. The maximum amount of water is in no way critical, but amounts in excess of 200 parts per part of locust bean gum are unnecessary and only increase drying time and/or heat requirements and may preclude some drying techniques, such as drum drying, which requires a relatively viscous liquid. In general, amounts of from about 50 to about 150 parts of water per part of locust bean gum are employed.

The water, locust bean gum and tricalcium phosphate can be combined simultaneously, or in any order. In a preferred technique, however, locust bean gum is added to the water and the resulting mixture thoroughly stirred to form a clear sol of hydrated gum in water. Then the tricalcium phosphate is stirred in. Because tricalcium phosphate is only very slightly soluble in water, it is preferably added in a finely divided form to ensure that it is uniformly dispersed throughout the locust bean gum. In general, the particle size should be below about 100 mesh, and particle sizes in the range of from about 200 to about 325 mesh are preferred.

Drying of the resulting dispersion may be effected by a variety of techniques, such as spray drying, tray drying, drum drying, and the like.

The dried product is then broken up into particles having the desired dimensions and, if necessary, screened to achieve the proper size range and distribution. The resulting particulate product comprises minute particles of the tricalcium phosphate dispersed throughout a locust bean gum matrix, and is substantially different in appearance and properties from mixtures of the same dry materials obtained by blending or the wet granulation technique.

The particulate direct compression vehicle of this invention is admixed with the active which it is desired to incorporate into tablet form and, if desired, fillers, disintegrating agents and lubricants, and the mixture tabletted by known direct compression procedures. The proportions of vehicle, actives, fillers, disintegrating agents and lubricants, are not critical, and obviously depend upon the active and the unit dose desired in the tablet. In general, however, the direct compression vehicle will comprise at least 10 percent of the tabletting mixture, and thus the resulting tablet, although amounts within the range of from about 70 percent to about 95 percent are most common.

By the term "active material" is meant any material intended for ingestion having a beneficial or desirable effect on the user. Suitable active materials include therapeutic materials, such as anesthetics, antibiotics, anti-tussives, vitamins, aspirin, antacids, and the like; food stuffs such as cocoa, dried otas, fruit flakes and the like; edible dyes and other food additives; and so on. The vehicle is a free-flowing granular material and imparts improved flow characteristics to the active material and other components of the blend, thereby assuring ease of tabletting.

The blend of direct compression vehicle, active material and other additives is mixed and directly compressed to form a tablet employing conventional techniques and apparatus.

The following examples are illustrative. Unless otherwise specified, all parts and percentages are by weight.

EXAMPLE I

A 10 gram portion of locust bean gum was added to 1,000 cc. water and the resulting mixture thoroughly stirred. Then 90 grams of tricalcium phosphate was added and thoroughly mixed to yield a creamy white suspension. The suspension was drum dried to yield a free-flowing powder, which was formed into a 13/32 inch, 0.5 gram tablet at 4,500 psi. The ejection pressure needed to eject the tablets from the die was from 100 to 150 psi and the Stokes hardness of the tablets was in excess of 45.

When disodium phosphate or calcium chloride were substituted for the tricalcium phosphate, tablets having a Stokes hardness of only 18 were obtained.

EXAMPLE II

A 30 gram portion of locust bean gum was added to 1,000 cc. water and stirred to form a viscous mixture. Then 70 grams of tricalcium phosphate was added, followed by 300-cc. and 200-cc. portions of water, with mixing to yield a homogenous milky suspension. After drum drying and tabletting as described in Example I, the ejection pressure was 40 psi and the Stokes hardness was 45.

EXAMPLE III

Employing procedures similar to those described in Example I, except that the suspension was oven dried at 60°C., compositions containing from 0 to 7 weight percent locust bean gum and 93 to 100 weight percent tricalcium phosphate were produced and formed into tablets. The Stokes hardness and dispersibility were measured and are summarized as follows:

| Tablet Composition, wt.% | | Product Properties | |
|---|---|---|---|
| Locust Bean Gum | Calcium Phosphate | Hardness | Dispersibility* |
| 0 | 100 | 11 | 15 min. |
| 0 | 100 | 13 | |
| 1 | 99 | 27 | 1 min. |
| 1 | 99 | 24 | |
| 5 | 95 | 43 | 3 min. |
| 5 | 95 | 40.5 | |
| 7 | 93 | 39 | 4½ min. |
| 7 | 93 | 37.5 | |

*Time to disperse in 10 cc. of water in closed test tube which was inverted at a rate of 30 times per minute.

Each of the direct compression vehicles of the foregoing examples can be blended in accordance with the following recipes and compressed to form tablets or wafers.

A. Confectionery Tablets or Wafers
  1. Lemon Flavored Confectionery Tablet:
    25.0 pts. direct compression behicle
    75.0 pts. powdered sugar
    1.0 pt. citric acid, dry
    0.25 pt. encapsulated lemon flavor
    0.10 pt. yellow color No. 5
    1.0 pt. magnesium stearate
  2. Grape Flavored Confectionery Tablet:
    50.0 pts. direct compression vehicle
    50.0 pts. 6X powdered sugar
    2.0 pts. tartaric acid
    0.25 pt. grape flavor
    0.05 pt. grape color
    0.5 pt. calcium stearate
  3. Cherry Flavored Confectionery Tablet:
    75.0 pts. direct compression vehicle
    25.0 pts. powdered sugar
    2.0 pts. fumaric acid
    .2 pt. cherry flavor
    .1 pt. red color
    1.0 pt. magnesium stearate B. PHARMACEUTICAL FORMULATIONS
  1. 50.0 pts. direct compression vehicle
    37.5 pts. aluminum hydroxide
    1.0 pt. magnesium stearate
  2. 100.0 pts. direct compression vehicle
    25.0 pts. calcium carbonate
    5.0 pts. magnesium carbonate
    1 drop peppermint oil
    2.0 pts. magnesium stearate
  3. 100.0 pts. direct compression vehicle
    25.0 pts. acetyl salicylic acid
    15.0 pts. corn starch
    2.0 pts. magnesium stearate
  4. 90.0 pts. direct compression vehicle
    10.0 pts. vitamin C in dry form
    2.0 pts. magnesium stearate Other active ingredients of use in blends with the direct compression vehicle are: sodium bicarbonate, acetanilid, phenecetin and magnesium trisilicate.

C. Specialty Products
  1. Invertase Tablet
    96.4 pts. direct compression vehicle
    3.6 pts. liquid triple strength invertase (K = 0.9)

1.0 pt. magnesium stearate
  2. Cocoa-Sugar Tablet
    35.0 pts. direct compression vehicle
    55.0 pts. powdered sugar 10.0 pts. high fat cocoa
0.2 pt. dendritic salt
1.0 pt. magnesium stearate After blending, the mixture is tabletted to form a cocoa-sugar tablet.

3. Highly Concentrated Color Tablet
    90.0 pts. direct compression
    10.0 pts. dried yellow FD and C No. 6

5. Yeast Food Tablet
    34.0 pts. calcium sulfate ($2H_2O$)
    23.0 pts. flour
    9.0 pts. ammonium chloride
    0.25 pt. potassium bromate
    17.75 pts. sodium dihydrogen phosphate
    16.0 pts. salt
    900.0 pts. direct compression vehicle
    10.0 pts. magnesium stearate

What is claimed is:

1. A particulate composition useful as a direct compression vehicle for forming tablets consisting essentially of an intimate co-dried admixture of a minor but effective portion of locust bean gum comprising at least about 0.5 weight percent of said co-dried admixture and a major portion of finely divided tricalcium phosphate having a particle size of below about 100 mesh, said mixture being obtained by admixing said locust bean gum and tricalcium phosphate with at least 25 parts of water per part of locust bean gum at ambient temperatures to form a fluid mixture and then drying said fluid mixture.

2. A composition according to claim 1 wherein the amount of locust bean gum is from about 0.5 weight percent to about 30 weight percent and the balance of said co-dried admixture is tricalcium phosphate.

3. A composition according to claim 2 wherein the amount of locust bean gum is from about 1 to about 10 weight percent and the balance of said co-dried admixture is tricalcium phosphate.

* * * * *